Patented July 7, 1942

2,288,609

UNITED STATES PATENT OFFICE 2,288,609

PROCESS OF PRODUCING ELECTRICAL CONDUCTORS

Donald K. Crampton, Marion, and Henry L. Burghoff, Waterbury, Conn., assignors to Chase Brass & Copper Co., Incorporated, New Haven, Conn., a corporation No Drawing. Application July 31, 1940, Serial No. 349,016

3 Claims. (Cl. 148—11.5)

This invention relates to improvements in processes of producing electrical conductors from age-hardenable copper-base alloys.

This application is a continuation-in-part of our application Serial No. 269,780 filed April 24, 1939.

One object of this invention is to provide an improved process of producing electrical conductors characterized by a combination of high electrical conductivity and high tensile strength, from age-hardenable copper-base alloys.

Other objects of this invention will appear from the present disclosure.

We have found that various forms of electrical conductors, such, for example, as conductor wires of various types, welding electrode tips, electrical connections, etc., when formed of age-hardenable copper-base alloys and treated as hereinafter set forth, possess a combination of high electrical conductivity and high tensile strength. The expression "combination of high electrical conductivity and high tensile strength" does not necessarily mean that each is particularly high, considered alone, but that the combination of these properties is attractive or high from a practical standpoint. In other words, the conductivity is high for a given tensile strength, or vice versa.

We have found that electrical conductors can be given a combination of high electrical conductivity and high tensile strength when made of copper-base alloys containing by weight, nickel from about 0.35% to about 2%, phosphorus from about 0.05% to about 0.6%, the ratio by weight of the nickel to phosphorus being from about 3 to 1 to about 10 to 1 and preferably being about 5 to 1, with or without metal selected from a group consisting of cadmium, tin and zinc, the cadmium not exceeding about 1%, the tin not exceeding about 1.5% and the zinc not exceeding about 5%, the total percent of cadmium and/or tin and/or zinc, if present, being such that the $$\frac{\% \text{ cadmium}}{1} \text{ plus } \frac{\% \text{ tin}}{1.5} \text{ plus } \frac{\% \text{ zinc}}{5}$$

is not greater than about 1, and copper, the copper, nickel and phosphorus, with or without cadmium and/or tin and/or zinc constituting about 96% or more of the alloy, with or without one or more additional elements in such substantially innocuous amounts as do not seriously impair the desired properties of the alloys, that is, in such amounts as do not essentially change the nature of the alloy, and such expressions as "the balance substantially of copper," etc., are intended to cover alloys including such amounts of additional elements.

Instead of using the foregoing described nickel plus phosphorus age-hardening constituent, any other suitable age-hardening constituent could be substituted therefor, such as iron and phosphorus in accordance with the disclosure of Patent No. 2,066,512 to Archer, or chromium and phosphorus in accordance with the disclosure of Patent No. 2,148,151 to Darby, or manganese and phophorus in accordance with the disclosure of Patent No. 2,123,628 to Hensel and Larsen or cobalt and phosphorus in accordance with the disclosure of Patent No. 2,123,629 to Hensel and Larsen. Instead of using only one age-hardening material, the age-hardening constituent may consist of material selected from two or more age-hardening materials.

The additional substantially-innocuous elements may range up to a total of about 4%, depending on what elements are added, some being more innocuous than others. Thus, while each of the elements aluminum and silicon should not be present much in excess of about 0.1%, silver, which is comparatively innocuous, may be present to as high as about 4%. In absence of silver, the total of all additional elements may be as high as about 2½%.

In order to produce alloys and electrical conductors in accordance with the foregoing disclosure and having a combination of high electrical conductivity and high tensile strength, the alloys are preferably treated by quenching or rapidly cooling from a temperature somewhat below the alpha boundary (below the temperature for complete solubility of the age-hardening constituent) and within the temperature range extending from about 1100° F. to about 1400° F., then aging or age hardening by heating above or at least as high as the temperature for maximum hardness or tensile strength, that is, within the range of about 850° F. to about 1050° F., and then cold-working an amount equivalent to a reduction of area of from about 30% to about 90%, and preferably from about 50% to about 85%. We have found that ordinary air cooling of material as finished by any ordinary hot-working procedure, such for instance, as rolling, forging, extruding, etc., constitutes the equivalent of a quenching treatment insofar as being in a condition capable of being age hardened. The preferable ranges of temperature for the quenching treatment and the range of temperature for the aging treatment to accomplish corresponding results for various alloys, will vary with the alloy system and the concentration of the alloying elements in the various alloys.

We have found in electrical conductors formed of the foregoing alloys, that in the region of moderate tensile strength, better properties of quenched, aged and cold-drawn or cold-worked material are obtained by quenching at a temperature below the alpha boundary, that is, below the temperature for maximum solution of the age-hardening constituent, and aging of the quenched material at a temperature slightly above or at least as high as the temperature for maximum hardness or tensile strength, and cold drawing not greater than about 85% reduction. With such a sequence of operations, a superior combination of tensile strength and conductivity is obtained. In the condition as aged or age hardened, maximum conductivity for short-time (commercially feasible) aging results from quenching below, preferably from about 50° F. to about 400° F. below, the alpha-solution boundary (which boundnary varies according to composition of the alloy), and aging at a temperature somewhat above or at least as high as that for maximum hardness and strength. Also, for any conductivity in the as-aged condition, regardless of how arrived at, the effect of subsequent cold-drawing on conductivity is small up to about 8 B & S gauge numbers reduction, that is, about 85% area reduction. For reductions above about 8 numbers, the conductivity falls off very seriously. For example, a wire formed of copper-nickel-phosphorus alloy quenched from 1300° F., and aged four hours at 900° F. had a conductivity of 64.1%. The effect of cold-drawing on this wire is shown in the following table:

| B & S gauge Nos. | Cold reduction, per cent | T. S., p. s. i. | Conductivity, per cent I. A. C. S. |
|---|---|---|---|
| 0 | 0 | 63,000 | 64.1 |
| 6 | 75 | 95,000 | 63.4 |
| 8 | 84 | 102,000 | 62.0 |
| 10 | 90 | 107,500 | 59.9 |
| 14 | 96 | 114,000 | 50.9 |

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. The process of producing an electrical conductor characterized by a combination of high electrical conductivity and high tensile strength from an age-hardenable copper-base alloy containing age-hardening material, comprising: rapidly cooling said alloy from temperature from about 50° F. to about 400° F. below the temperature for complete solubility of said age-hardening constituent and within the range from 1100° F. to 1400° F.; re-heating it to temperature at least as high as to give maximum strength and within the range from 850° F. to 1050° F.; and then cold-working it from about 30% to about 90% reduction of area.

2. The process of producing an electrical conductor characterized by a combination of high electrical conductivity and high tensile strength, from an age-hardenable copper-base alloy containing age-hardening material, comprising: rapidly cooling said alloy from temperature from about 50° F. to about 400° F. below the temperature for complete solubility of said age-hardening constituent and within the range from 1100° F. to 1400° F.; re-heating it to temperature at least as high as to give maximum strength and within the range from 850° F. to 1050° F.; and then cold-working it a substantial amount.

3. The process of producing an electrical conductor characterized by a combination of high electrical conductivity and high tensile strength, from an age-hardenable copper-base alloy containing age-hardening material, comprising: rapidly cooling said alloy from temperature from about 50° F. to about 400° F. below the temperature for complete solubility of said age-hardening constituent and within the range from 1100° F. to 1400° F.; re-heating it to temperature at least as high as to give maximum strength and within the range from 850° F. to 1050° F.; and then cold-working it from about 50% to about 85% reduction of area.

DONALD K. CRAMPTON.
HENRY L. BURGHOFF.

CERTIFICATE OF CORRECTION.

Patent No. 2,288,609. July 7, 1942.

DONALD K. CRAMPTON, ET AL.

It is hereby certified that the name and address of the assignee in the above numbered patent was erroneously described and specified as Chase Brass & Copper Co., Incorporated, of New Haven, Connecticut, whereas said name and address should have been described and specified as Chase Brass & Copper Co. Incorporated, of Waterbury, Connecticut; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.